(12) United States Patent
Védrine

(10) Patent No.: US 6,898,194 B1
(45) Date of Patent: May 24, 2005

(54) METHOD AND SYSTEM FOR FAST ACCESS TO AN UPLINK CHANNEL IN A MOBILE COMMUNICATIONS NETWORK

(75) Inventor: Arnaud Védrine, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/568,451

(22) Filed: May 9, 2000

(51) Int. Cl.$^7$ ................................................ H04Q 7/00
(52) U.S. Cl. ...................... 370/329; 370/337; 370/341; 370/347; 370/338
(58) Field of Search ............................... 370/341, 352, 370/355, 356, 321, 336, 337, 345, 347, 458, 329, 330, 348, 431, 338, 349, 442, 493, 494; 375/220; 455/464, 450, 451

(56) References Cited

U.S. PATENT DOCUMENTS

| | | | |
|---|---|---|---|
| 4,949,395 A | 8/1990 | Rydbeck ....................... 455/33 |
| 5,475,869 A | 12/1995 | Gomi et al. ................... 455/63 |
| 5,519,779 A | 5/1996 | Proctor et al. ................. 380/34 |
| 5,640,395 A * | 6/1997 | Hamalainen et al. ........ 370/322 |
| 5,754,537 A * | 5/1998 | Jamal ........................... 370/330 |
| 6,137,789 A * | 10/2000 | Honkasalo .................... 370/342 |
| 6,282,182 B1 * | 8/2001 | Pecen et al. .................. 370/336 |
| 6,414,945 B1 * | 7/2002 | Chennakeshu et al. ...... 370/317 |
| 6,496,490 B1 * | 12/2002 | Andrews et al. ............. 370/329 |
| 6,532,225 B1 * | 3/2003 | Chang et al. ................. 370/341 |
| 6,542,501 B1 * | 4/2003 | Tikka ........................... 370/389 |
| 6,567,396 B1 * | 5/2003 | Pohjanvouri et al. ........ 370/349 |
| 6,571,095 B1 * | 5/2003 | Koodli ....................... 455/435.1 |
| 6,608,832 B2 * | 8/2003 | Forslöw ....................... 370/353 |
| 6,611,536 B1 * | 8/2003 | Ahmed ......................... 370/493 |

FOREIGN PATENT DOCUMENTS

| | | |
|---|---|---|
| EP | 1 006 695 A1 | 6/2000 |
| WO | WO 98/35523 | 8/1998 |
| WO | WO 98/37706 | 8/1998 |

OTHER PUBLICATIONS

U.S. Appl. No. 09/527,415, filed Mar. 17, 2000, Védrine.
U.S. Appl. No. 09/568,452, filed May 9, 2000, Lindheimer et al.
Guo, et al., "Aggressive Packet Reservation Multiple Access Using Signatures", *IEEE International Symposium on Personal, Indoor and Mobile Radio Communications,* Sep. 18, 1994, pp. 1247–1253.
EPO Standard Search Report, Nov. 15, 2000.

* cited by examiner

Primary Examiner—Ajit Patel

(57) ABSTRACT

A method and system are disclosed for fast access to an uplink channel for a mobile station in a packet data radio network. A plurality of mobile stations are assigned to a first uplink channel. A mobile station assigned to the first uplink channel transmits in an uplink transmission block real time information. In response to the transmission, a base station reassigns the other mobile stations that are assigned to the first uplink channel and are involved in the communication of real time information in a downlink transmission block immediately following the uplink transmission block. Thereafter, the first mobile station continues transmitting real time information on the first uplink channel.

26 Claims, 3 Drawing Sheets

| Block | Channel DL1 | Channel DL2 | Channel DL3 |
|---|---|---|---|
| DB1 | SID RT user 6 | nRT user 3, TX + other nRT users, silent | RT user 2, TX + nRT users, silent |
| DB2 | SID RT user 3 | nRT user 3, TX + other nRT users, silent | RT user 2, TX + nRT users, silent |
| DB3 | Control message to RT user 4 including the blocks reserved to this user on channel UL1 for transmission of its SID | nRT user 3, TX + other nRT users, silent | RT user 2, TX + nRT users, silent |
| DB4 | SID RT user 7 | nRT user 3, TX + other nRT users, silent | RT user 2, TX + nRT users, silent |
| DB5 | Control message to signal to RT user 3 that it should move to channel UL3 on the UL, and to RT user 4 that it should listen to channel DL2 in the next DL block | nRT user 3, TX + nRT users, silent | RT user 2, TX (block containing the new UL channel RT user 2 should camp on the UL: here UL3) + nRT users, silent |
| DB6 | ... | RT user 4, TX + nRT users, silent | ... |

| Block | Channel UL1 | Channel UL2 | Channel UL3 |
|---|---|---|---|
| UB1 | SID RT user 1 | nRT user 1, TX<br>RT user 2, DTX<br>RT user 3, DTX<br>+ other nRT users, silent | RT user 4, TX<br>+ nRT users, silent |
| UB2 | SID RT user 2 | nRT user 1, TX<br>RT user 1, DTX<br>RT user 3, DTX<br>+ other nRT users, silent | RT user 4, first SID<br>- nRT users, silent |
| UB3 | SID RT user 3 | nRT user 1, TX<br>RT user 1, DTX<br>RT user 3, DTX<br>+ other nRT users, silent | nRT user 2, TX<br>RT user 4, DTX<br>+ other nRT users, silent |
| UB4 | SID RT user 5 | nRT user 1, TX<br>RT user 2, DTX<br>RT user 3, DTX<br>+ other nRT users, silent | nRT user 2, TX<br>RT user 4, DTX<br>+ other nRT users, silent |
| UB5 | SID RT user 4 | nRT user 1, TX<br>RT user 1, silent<br>RT user 2, DTX<br>RT user 3, DTX<br>+ other nRT users, silent | nRT user 2, TX<br>+ other nRT users, silent |
| UB6 | ... | RT user 1, TX<br>+ nRT users, silent | nRT user 2, TX<br>RT user 2, DTX<br>RT user 3, DTX<br>RT user 4, DTX<br>+ other nRT users, silent |

METHOD AND SYSTEM FOR FAST ACCESS TO AN UPLINK CHANNEL IN A MOBILE COMMUNICATIONS NETWORK

CROSS REFERENCE TO RELATED APPLICATION

This application is related to an application entitled "Method and System for Fast Access to an Uplink Channel in a Mobile Communications Network" (Ser. No. 09/527,415, filed Mar. 17, 2000, and an application entitled "Method and System for Fast Access to an Uplink Channel in a Mobile Communications Network" (Ser. No. 09/568,451), filed May 9, 2000. The applications are incorporated by reference herein.

BACKGROUND OF THE INVENTION

1. Technical Field of the Invention

The present invention relates in general to multiplexing users in a telecommunication system, and in particular to a method and system for accessing communication resources in a radio network.

2. Description of Related Art

With the introduction of new services or applications over packet data systems in a mobile communication network, for example, real time (RT) services such as VoIP, there will be a large variety of quality of service (QoS) demands on the network. Certain users, for example, those utilizing real time voice applications will have a very high demand for the availability of transmission resources, whereas users, for example, who transmit short messages or electronic mail, will be satisfied with a lower availability of transmission resources.

For example, in the well known Universal Mobile Telecommunications System (UMTS), there are four proposed QoS classes: the conversational class; streaming class; interactive class; and background class. The main distinguishing factor between these classes is the sensitivity to traffic delay. Conversational class traffic is intended for traffic which is very delay sensitive while background class traffic is the most delay insensitive traffic class. Conversational and streaming classes are intended to be used to carry RT traffic flows and interactive and background classes are intended to be used to carry Internet applications (e.g., www, e-mail, telnet, FTP, etc.).

Real time services include sensitive time constraints over a reserved access channel. That is, delays in the transmission and/or reception of successive packets can have noticeable and undesirable QoS effects (e.g., on voice quality). These time constraints can be handled by always reserving access time at predetermined intervals during a communication with high QoS demands. In this way, a real time service communication can proceed uninterrupted since it will be allocated communication resources regardless of whether or not any packets will be sent. That is, for example, silent periods will occur in a real time voice communication, and in order to conserve battery resources, the silent periods need not be transmitted, or the transmission power can be considerably reduced.

Silent periods can be detected in a voice activity detector (VAD) device. During silent periods, a silence descriptor (SID) signal is sent to the receiver. The receiver generates comfort noise in order to closely mimic the naturally occurring background noise so that the receiving user perceives that the communication path between the transmitter and the receiver is still open and operable. In addition to the SID, an indication is sent to the transmitter that there is no voice activity detected and the transmitter can reduce its transmitter output power or set it to zero for that connection. This technique is called discontinuous transmission (DTX). With DTX enabled, interference is decreased in the system, since transmitters will only emit output power when there is information to be transmitted (e.g., when voice activity is detected or when SIDs are transmitted).

Resources are allocated for the real time services users regardless of whether or not packets are sent from the transmitter. However, it would be advantageous if these silent periods could be used in a more efficient way by allowing other applications to use the allocated resources during the silent periods without lowering the QoS of real time service.

In connection with the development of third generation mobile communication systems, new wireless multimedia and data applications are being designed and introduced. To support these new applications, improved data transmission technologies are also being developed. One such technology is Enhanced Data rates for Global Evolution (EDGE), which uses a more efficient radio-modulation technology that is optimized for data communications and that can be implemented on existing GSM and IS-136 systems. When used in connection with General Packet Radio Service (GPRS), a packet-switched technology that delivers speeds of up to 115 kilobits per second (kbit/s), EDGE technology can increase end user data rates up to 384 kbit/s, and potentially higher in high quality radio environments.

In connection with the development of EDGE and other technologies for supporting higher data rates, a number of techniques for multiplexing different users on the same set of resources have been developed. For example, in the packet-switched mode of EDGE technology (i.e., Enhanced GPRS (EGPRS)), the capability exists to multiplex different users on the same time slot. In this mode, packet data is transferred via a wireless communication link using 20 millisecond (ms) radio blocks. Each radio block is transferred to or from a particular user as a sequence of four consecutive bursts on a time slot that is assigned to the user. Subsequently, the time slot can be assigned to another user for the transmission of four bursts to or from that other user or can be again assigned to the same user for the transmission of an additional four bursts.

To send data on the downlink, the base station knows when new packets need to be transmitted to each user. Accordingly, the base station transmits data destined for a particular user as part of a temporary block flow (TBF). The TBF is a connection used by the base station and the user's mobile station to support the unidirectional transfer of packet data on a packet data physical channel. The network assigns each TBF a temporary flow identity (TFI) value, which uniquely identifies the TBF, thereby distinguishing the TBF from other TBFs destined for other mobile stations. Based on the TFI value, each individual mobile station that is multiplexed on a specific packet data physical channel is able to determine which data packets are meant for that mobile station. In other words, the base station is able to address data packets to particular mobile stations using the appropriate TFI value. On the uplink portion of the communication, however, the situation is more cumbersome because the base station does not know which mobile stations need to send data packets unless and until the mobile stations notify the base station that they have data to be sent.

To facilitate data transfers on the uplink, therefore, a mobile station that needs uplink resources informs the base station that it has data packets to send by sending a message on the random access channel (RACH) or the packet RACH (PRACH), which are control channels used only on the uplink to request GPRS resources. The base station can then schedule uplink resources for the mobile station by sending an uplink state flag (USF) in the header of a radio block that is sent on the downlink. The USF serves to identify the specific mobile station that is authorized to send data packets in the next uplink radio block.

The problem with this process is that the radio channel activation procedure (i.e., for a mobile station to obtain authorization to use a radio channel on the uplink) can take a relatively long time (up to 300 ms), even if the mobile station successfully obtains authorization on the first attempt to request such access. In some cases, however, a collision can occur between two or more different mobile stations attempting to request access to the radio channel at the same time. When such a collision occurs, the mobile station backs off and waits until a later time to resend the request. As a result, the delay for accessing the radio channel is further increased.

In connection with more recent EGPRS standards (i.e., EGPRS standard release 00), real time applications (e.g., packet data speech) will be supported. In addition, it will be possible to multiplex real time users with non-real time users on the same time slot. This can be accomplished by transmitting the non-real time users' blocks during silent periods of the real time user, such as between the talkspurts of a speech user. The delay inherent in existing radio channel activation procedures, however, is generally unacceptable for real time applications, particularly in the case of speech applications because the first blocks of a talkspurt are very important to maintain users' perceptions of high speech quality. Accordingly, real time users must be able to access the radio channel much faster than is supported by existing procedures.

There is a need, therefore, for a method and system that would allow real time users to quickly and efficiently obtain access to uplink radio channels for purposes of transmitting packet data. The system and method should allow multiplexing of real time users with other users on the same radio channel. Preferably, requests for such access would also require only a minimal amount of bandwidth so as to avoid using up valuable radio resources.

SUMMARY OF THE INVENTION

The present invention comprises a method and system for obtaining fast access to a multiplexed uplink channel in a mobile telecommunications network. In accordance with one embodiment of the invention, a plurality of mobile stations are assigned to and otherwise camp onto a first uplink channel. A first mobile station assigned to the first uplink channel and needing to send real time information transmits data in a first uplink transmission block. Upon receiving the data from the first mobile station, the system reassigns other mobile stations that are involved in communication of real time information to one or more other uplink channels during the next downlink block. After the other mobile stations have been assigned to the other uplink channels and, optionally, after a second block during which the first mobile station refrains from sending additional real time information, the first mobile station begins transmitting real time information in the next uplink transmission block and subsequent uplink transmission blocks on the first uplink channel as necessary.

In accordance with another embodiment of the invention, a mobile telecommunications system includes a packet data network and a radio network. The packet data network includes a packet data support node for routing data communications to and receiving data communications from a plurality of mobile stations located in an area served by the packet data support node. The radio network serves to transmit data packets between the mobile stations and the packet data support node and operates to assign to a plurality of mobile stations a first radio resource associated with a first uplink channel. The radio network further operates to detect a transmission of real time information from a first mobile station in a first uplink transmission block on the first radio resource and, in response to the detected transmission, to assign other mobile stations that are assigned to the first radio resource and are involved in the communication of real time information, to a second radio resource associated with a second uplink channel. After the reassignment and, optionally, following a second uplink transmission block during which the first mobile station does not transmit real time information, the first radio resource receives real time information from the first mobile station on the first uplink channel.

In another embodiment, a plurality of mobile stations are assigned to an uplink channel, wherein more than one of the mobile stations are operating in accordance with a real time application. Simultaneous transmissions of real time information from multiple ones of such mobile stations are subsequently detected on a first block of the uplink channel. In response to this detection of simultaneous transmissions on the first block, each mobile station operating in accordance with a real time application on the uplink channel except one is reassigned to a distinct uplink channel. A mobile station that transmitted real time information in the first block on the uplink channel and thereafter received a reassignment message knows that a collision occurred in the first block and thus may retransmit in a subsequent block the information previously transmitted in the first block. Alternatively, the mobile station operating in accordance with a real time application is assigned a distinct block in which to transmit on the uplink channel.

BRIEF DESCRIPTION OF THE DRAWINGS

For a more complete understanding of the present invention, reference is made to the following detailed description taken in conjunction with the accompanying drawings wherein:

FIG. 2 is a schematic diagram of a downlink communication for obtaining fast access to an uplink channel in a multiplexed packet data network in accordance with one embodiment of the invention; and FIG. 3 is a schematic diagram of an uplink communication for obtaining fast access- to an uplink channel in a multiplexed packet data network in accordance with an alternative embodiment of the invention.

DETAILED DESCRIPTION OF THE INVENTION

Figure 1:
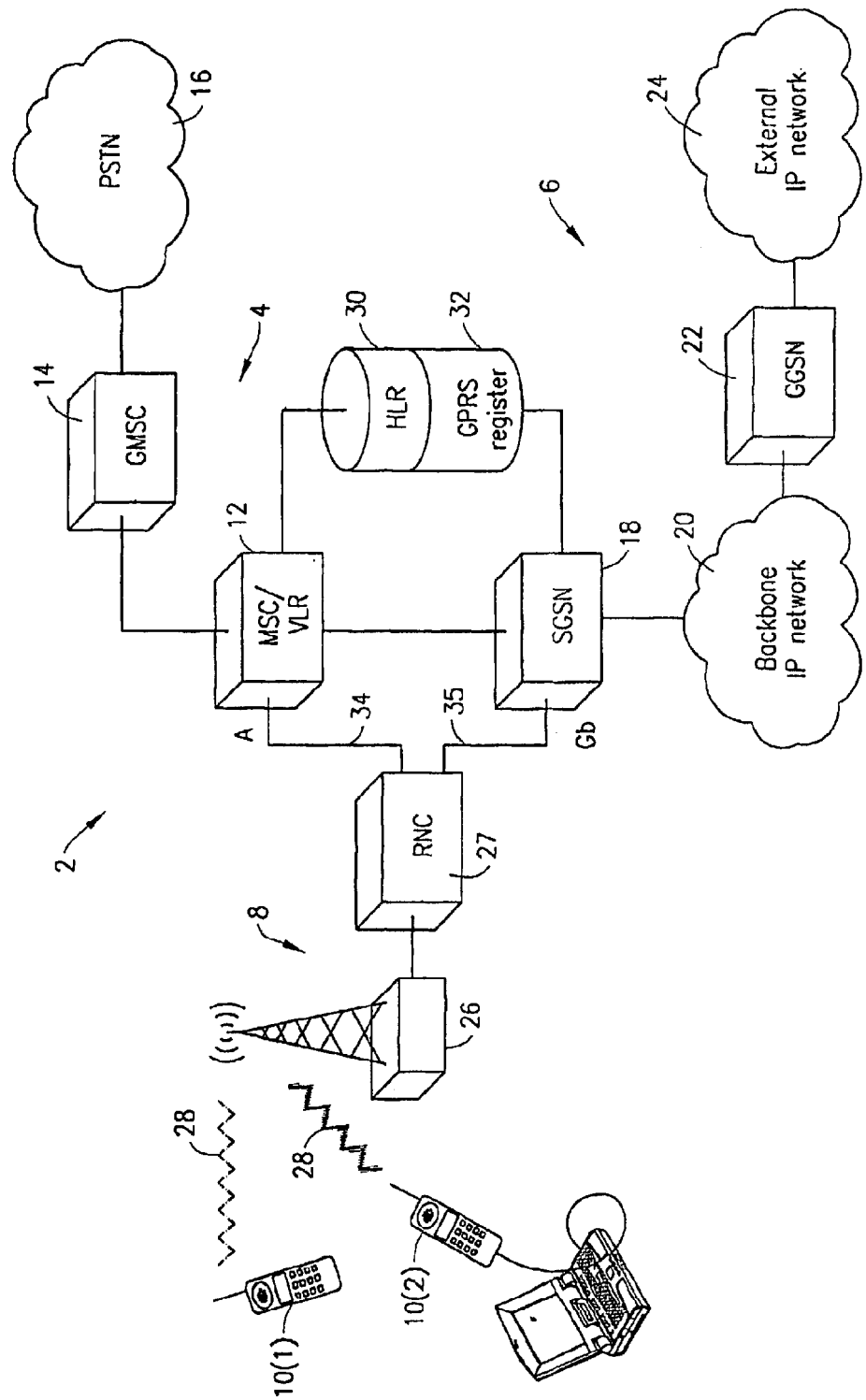
FIG. 1 is a block diagram of a mobile telecommunications system in which the present invention can be implemented.

Reference is now made to the Drawings wherein like reference characters denote like or similar parts throughout the various Figures. Referring now to FIG. 1, there is illustrated a block diagram of a mobile telecommunications system 2 in which the present invention can be implemented. In particular, the system 2 depicted in the Figure is a time division multiple access (TDMA) system, which operates according to IS-136 standards. Although the invention is illustrated and described in connection with a TDMA system, it will be recognized by those skilled in the art that the invention is also applicable in other types of telecommunications systems, such as GSM. In addition, the system supports EGPRS technology. The mobile telecommunications system 2 includes a circuit-switched network 4, a packet-switched network 6, and a radio network 8 that is shared by the circuit-switched and packet-switched networks 4 and 6. Generally, the circuit-switched network 4 is primarily used for voice applications, while the packet-switched network 6 is primarily used for data applications. In accordance with third generation mobile telecommunications standards, however, the circuit-switched network 4 can also support data communications, and the packet-switched can also support voice communications.

The circuit-switched network 4 includes a number of mobile switching center/visitor location registers (MSC/VLRs) 12. For purposes of simplifying the illustration, however, only one MSC/VLR 12 is shown. Each MSC/VLR 12 serves a particular geographic region and is used for controlling communications in the served region and for routing communications to other MSC/VLRs 12. The VLR portion of the MSC/VLR 12 stores subscriber information relating to mobile stations 10 that are currently located in the served region. The circuit-switched network 4 further includes at least one gateway mobile switching center (GMSC) 14 that serves to interconnect the circuit-switched network 4 with external networks, such as a public switched telephone network (PSTN) 16.

The packet-switched network 6 includes a number of serving GPRS support nodes (SGSN) 18, which are used for routing and controlling packet data communications, and a backbone IP network 20. A gateway GPRS support node (GGSN) 22 interconnects the packet-switched network 6 with an external IP network 24 or other external data networks.

The radio network 8 includes a plurality of cells. Each cell in the mobile telecommunications system 2 is served by a base station 26 that communicates with mobile stations 10 in the cell via an air interface 28. As is currently being planned for future TDMA systems integrated with a packet-switched GPRS network, a radio network controller (RNC) 27 will control a plurality of base stations 26 (as in existing GSM systems). For circuit-switched communications, signals are routed from the MSC/VLR 12, to the radio network controller 27 via an A interface 34, to the base station 26 for the cell in which the target mobile station 10 is currently located, and over the air interface 28 to the mobile station 10. For packet data transmissions, on the other hand, signals are routed from the SGSN 18, to the radio network controller 27 via a Gb interface 35, to the base station 26 for the cell in which the target mobile station 10 is currently located, and over the air interface 28 to the mobile station 10.

Each mobile station 10 is associated with a home location register (HLR) 30. The HLR 30 stores subscriber data for the mobile station 10 that is used in connection with circuit-switched communications and can be accessed by the MSC/VLRs 12 to retrieve subscriber data relating to circuit-switched services. Each mobile station 10 is also associated with a GPRS register 32. The GPRS register 32 stores subscriber data for the mobile station 10 that is used in connection with packet-switched communications and can be accessed by the SGSNs 18 to retrieve subscriber data relating to packet-switched services.

In a preferred embodiment of the present invention, telecommunication system 2 utilizes a discontinuous transmission (DTX) technique during which a mobile station 10 temporarily discontinues communication of real time information. In particular, telecommunication system 2 provides for the transmission of a first silence descriptor (SID) message by a transmitter to a receiver, on either the uplink or the downlink, to notify the receiver of the beginning of a silent period. The SID message indicates the type or level of noise to be generated at the receiver so that the receiver closely mimics naturally occurring background noise. In this way, a user at the receiver does not perceive a break in communication with the transmitter. SID messages are updated periodically during a silent DTX period by the transmitter sending new SID messages according to a predetermined schedule. DTX techniques are known in the art.

In order to suitably statistically multiplex mobile stations 10 on a single uplink channel, SID messages are transmitted on dedicated uplink and downlink SID channels according to a technique disclosed in related application "Method and System for Dedicating Uplink and Downlink Channels in a Mobile Communications Network" incorporated herein by reference. Each mobile station 10 in a downlink DTX period thus listens to and receives SID messages on the dedicated downlink SID channel. In addition, base station 26 informs each real time user entering a DTX period on the uplink the particular uplink transmission block or blocks in which the real time user is authorized to transmit one or more uplink SID messages. Because the transmission of SID messages is not time critical, telecommunication system 2 preferably also utilizes the dedicated downlink SID channel to transmit control messages for controlling the assignment and reassignment of mobile stations on the uplink channels. In particular, base station 26 sends control messages on the dedicated downlink SID channel to notify mobile stations 10 of the reassignment thereof to another uplink channel.

According to a preferred embodiment of the present invention, a mobile station 10 can be assigned to an uplink channel and a downlink channel independently. In other words, there is no fixed duplex distance between the assigned uplink and downlink frequencies. A mobile station 10 thus can thus be reassigned, for example, to a new uplink channel without reassigning or otherwise affecting the assignment of the downlink channel.

Referring to FIGS. 2 and 3, there are shown schematic diagrams exemplifying radio communication on the downlink and uplink, respectively, according to a preferred embodiment of the present invention. Telecommunication system 2, and particularly base station 26 and/or radio network controller 27 multiplexes different users, including mobile stations that are involved with the communication of real time information (hereinafter referred to as "real time users") and mobile stations that are involved with the communication of information other than real time information (hereinafter referred to as "non-real time users"), on the same set of uplink and downlink channels. With respect to uplink transmissions, a first real time user that is assigned to and/or camped on an uplink channel on which other real time and non-real time users are assigned begins transmitting real time information in an uplink transmission block as soon as the real time information is available for transmitting. This transmission of real time information occurs regardless of whether or not a non-real time user transmits non-real time information in the uplink transmission block. In response to the transmission of real time information by the first real time user, base station 26 and/or radio network controller 27 moves the other real time users that are assigned to the uplink channel to one or more other uplink channels and thereby schedules the first real time user to transmit in one or more subsequent uplink transmission blocks on the uplink channel. In this way, the real time user having real time information to transmit can substantially immediately transmit the real time information without another real time user contending for use of the assigned uplink channel.

An exemplary operation of the present invention will be described with reference to FIGS. 2 and 3. FIG. 2 shows communication in six successive downlink transmission blocks DB1–DB6 on three downlink channels DL1–DL3. FIG. 3 shows communication in six successive uplink transmission blocks UB1–UB6 on three uplink channels UL1–UL3. It is understood that uplink transmission blocks UB1–UB6 and downlink transmission blocks DB1–DB6 are illustrative of a non-repetitive series of transmission blocks on uplink channels UL1–UL3 and downlink channels DL1–DL3, respectively.

On the downlink, SID messages are sent to real time users in a downlink DTX period on a dedicated downlink SID channel DL1. On the uplink, SID messages are transmitted on a dedicated uplink SID channel UL1 by real time users in an uplink DTX period. Real time users RT1, RT2, and RT3 are initially assigned to transmit on uplink channel UL2 and real time user RT4 is assigned to transmit on uplink channel UL3. When in an uplink DTX period, however, each of real time users RT1–RT4 is scheduled to periodically move to uplink channel UL1 to send an SID message at the scheduled uplink transmission block.

As shown in FIG. 3, each real time user RT1–RT3 (uplink channel UL2) is in a DTX period during uplink transmission blocks UB1, UB2 and UB3. Because no real time user is transmitting real time information during this time, non-real time users, such as non-real time user nRT1, are scheduled by base station 26 to transmit information other than real time information on uplink channel UL2. In this way, the utilization of channel resources for uplink channel UL2 is maximized.

In uplink transmission block UB4, however, a real time user RT1 begins transmission of real time data on uplink channel UL2, thus creating a collision with non-real time user nRT1. Upon reception of the real time transmission and identification of real time user RT1 as the transmitter of the real time information, base station 26 moves real time users RT2 and RT3 to uplink channel UL3 in the next downlink transmission block (i.e., downlink transmission block DB5). Methods for detecting and/or receiving transmissions of real time users with non-real time users during the same uplink transmission block is described in above-identified related application "Method and System for Fast Access to an Uplink Channel in a Mobile Communications Network", and incorporated by reference herein.

In particular, because real time user RT2 is receiving real time information on downlink channel DL3, base station 26 transmits to real time user RT2 in downlink transmission block DB5 a control message having the reasssignment from uplink channel UL2 to uplink channel UL3 as an inband signal. In other words, the reassignment message is embedded in the real time information transmitted on downlink channel DL3. Concerning real time user RT3, a control signal containing the uplink reassignment information is transmitted to RT3 in downlink transmission block DB5 on downlink channel DL1. The control signal is transmitted in downlink transmission block DB5 instead of or together with the SID information normally scheduled for transmission therein. Because SID information is not time critical, the transmission of the SID information is delayed for transmission in a subsequent downlink transmission block, such as downlink transmission block DB6. Delaying downlink SID information is made possible because real time users in a downlink DTX period continuously listen on downlink channel DL1 for SID messages. It is noted that other real time users that were initially assigned to uplink channel UL2 and that are in a downlink DTX period may receive the same control signal in downlink transmission block DB5 in addition to real time user RT3.

Following real time information being transmitted by real time user RT1 during uplink transmission block UB4 on uplink channel UL2, real time user RT1 may optionally refrain from transmitting in uplink transmission block UB5 and instead wait until uplink transmission block UB6 for continuing the transmission of real time information. This non-transmission during a second uplink transmission block by a real time user will minimize the risk of a collision with another real time user transmitting on uplink channel UL2 before base station 26 is able to move the real time users therefrom. In the exemplary operation shown in FIG. 3, non real time user nRT1, which was scheduled by base station 26 to transmit in uplink transmission block UB5, transmits information other than real time information during uplink transmission block UB5.

When a real time user completes the transmission of real time information and thereupon enters an uplink DTX period, base station 26 schedules the uplink transmission block or blocks in which the real time user is authorized to send one or more SID messages on dedicated uplink channel UL1. For example, real time user RT4 sends real time information in uplink transmission block UB1 on uplink channel UL3 and transmits a first SID message in uplink transmission block UB2 (FIG. 3). In this example, real time user RT4 is in a downlink DTX period and therefore continuously listens for downlink SID messages on downlink channel DL1. Accordingly, base station 26 sends a control message to real time user RT4 in downlink transmission block DB3 on downlink channel DL1 that informs real time user RT4 that its SID messages are scheduled to be sent in reserved uplink transmission block or blocks on uplink channel UL1. The control message thus informs real time user RT4 that SID messages therefrom be transmitted with a particular periodicity, beginning in uplink transmission block UB5. Alternatively, real time user RT4 can be authorized each time an SID message should be sent thereby. It is noted that, because the transmission of an SID message is not time critical, base station 26 may transmit the control message to real time user RT4 during a downlink transmission block subsequent to downlink transmission block DB3. It is further noted that the control message could be sent to real time user RT4 together with a downlink SID message thereto, in the event that real time user RT4 is in a DTX period on the downlink.

As stated above, the preferred embodiment of the present invention allows for a mobile station 10 having real time information (a real time user) to begin transmitting the real time information substantially immediately after the real time information becomes available. The preferred embodiment of the present invention addresses the concurrent transmission of real time information by two or more real time users. In the event multiple real time users transmit real time information in an uplink transmission block on an uplink channel, base station 26 moves each real time user assigned to the uplink channel except for one to a distinct or different uplink channel. This is performed by base station 26 transmitting a reassignment control message to such real time users in the downlink transmission block immediately following the uplink transmission block in which the real time information is sent. A real time user that transmitted real time information that also received the control message understands that base station 26 did not relay the real time information and thus resends the previously transmitted uplink transmission block or alternatively proceeds with the following block or blocks on the newly assigned channel. A real time user that transmitted real time information that did not receive the control message (i.e., the one real time user that was not moved to a distinct uplink channel) continues to transmit its real time information after waiting one block so as to minimize the risk of a collision with another real time user that had not yet been reassigned to another uplink channel.

Alternatively, it is possible for the real time user RT1 to continue to transmit without any interruption in the transmission, which would enhance the perceived speech quality provided that no collision problems occur.

Although preferred embodiments of the method and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A method for obtaining fast access to a multiplexed uplink channel in a mobile telecommunications system, comprising the steps of:
    assigning a plurality of mobile stations to a first uplink channel;
    receiving real time data in a first block on the first uplink channel from a first mobile station assigned to the first uplink channel; and
    reassigning mobile stations other than the first mobile station previously assigned to the first uplink channel to at least one second uplink channel in response to the reception of the real time data.

2. The method of claim 1, further comprising the steps of:
    dedicating a third uplink channel for transmission of silence description (SID) information from a mobile station in a discontinuous transmission (DTX) state; and
    scheduling when each mobile station in an uplink DTX state is to transmit SID information on the third uplink channel.

3. The method of claim 1, further comprising the steps of:
    dedicating a third uplink channel for transmission of silence description (SID) information from a mobile station in a discontinuous transmission (DTX) state on the uplink;
    receiving a first SID signal from the first mobile station on the first uplink channel; and
    following the reception of the first SID signal from the first mobile station, scheduling when the first mobile station is to transmit SID information on the third uplink channel.

4. The method of claim 3, wherein the step of scheduling comprises the step of sending a control signal to the first mobile station on a downlink channel to identify at least one block on the third uplink channel during which the SID information is to be transmitted by the first mobile station.

5. The method of claim 4, further comprising the step of:
    dedicating a first downlink channel over which SID information is transmitted to mobile stations in a DTX state on the downlink, the control signal sent to the first mobile station being transmitted on the first downlink channel.

6. The method of claim 1, further comprising the step of:
    dedicating a first downlink channel over which silence description (SID) information is transmitted to mobile stations in a discontinuous transmission (DTX) state on the downlink;
    wherein the step of reassigning comprises the steps of:
        sending a downlink signal to the other mobile stations which identifies at least one second uplink channel to which the other mobile stations are assigned; and
        delaying the sending of SID information to at least one of the other mobile stations in a downlink DTX state, until after the downlink signal has been sent.

7. The method of claim 1, wherein the step of reassigning comprises the step of sending to at least one of the other mobile station an inband signal including an identification of the at least one second uplink channel to which the at least one other mobile station is reassigned.

8. The method of claim 1, further comprising the step of:
    receiving data other than real time data in a second block on the first uplink channel from a mobile station other than the first mobile station; and
    receiving real time data in a third block and successive blocks thereafter on the first uplink channel from the first mobile station.

9. The method of claim 1, further comprising the step of:
    receiving real time data in the first block on the first uplink channel from a second mobile station assigned to the first uplink channel;
    wherein the step of reassigning reassigns the second mobile station and other mobile stations assigned to the first uplink channel that are involved with the communication or real time data to the at least one second uplink channel.

10. The method of claim 1, wherein the step of reassigning assigns the mobile stations previously assigned to the first uplink channel to the at least one second uplink channel in a first block on at least one downlink channel substantially immediately following the first block on the first uplink channel.

11. The method of claim 1, wherein the real time information in the first uplink block and subsequent uplink blocks are organized in packets.

12. The method of claim 1, wherein the step of reassigning reassigns those mobile stations that are involved in communicating real time information.

13. A mobile telecommunications system, comprising:
    a packet data network including a packet data support node for routing data communications to and receiving data communications from a plurality of mobile stations located in an area served by the packet data support node; and
    a radio network for transmitting data packets between said plurality of mobile stations and the packet data support node, wherein said radio network operates to:
        assign a plurality of mobile stations to a radio resource associated with a first uplink channel;
        detect a transmission of real time information in a first uplink transmission block from a first mobile station by the radio resource associated with the first uplink channel; and
        reassign mobile stations assigned to the radio resource associated with the first uplink channel other than the first mobile station to a radio resource associated with at least one second uplink channel in response to the detected transmission of real time information from the first mobile station.

14. The system of claim 13, wherein the radio network comprises a base station, wherein said base station is operable to perform the assignment of the mobile stations to the radio resource associated with the first uplink channel, the detection of the transmission from the first mobile station, and the reassignment of the mobile stations other than the first mobile station to the radio resource associated with the second uplink channel.

15. The system of claim 13, wherein the radio network comprises a radio network controller, wherein said radio network controller is operable to perform the assignment of the mobile stations to the radio resource associated with the first uplink channel, the detection of the transmission from the first mobile station, and the reassignment of the mobile stations other than the first mobile station to the radio resource associated with the at least one second uplink channel.

16. The system of claim 13, wherein the radio network operates to:
    transmit to each mobile station in a discontinuous transmission (DTX) state silence description (SID) information on a first downlink channel;
    reassign the mobile stations other than the first mobile station to the radio resource associated with the at least one second uplink channel by transmitting an indication of the reassignment on the first downlink channel in a first downlink transmission block substantially immediately following the first uplink transmission block; and
    transmit, on the first downlink channel in a downlink transmission block occurring after the first downlink transmission block, SID information for at least one mobile station in the DTX state normally transmitted in the first downlink transmission block on the first downlink channel.

17. The system of claim 13, wherein the radio network operates to:
    identify mobile stations assigned to the radio resource associated with the first uplink channel that are involved with the communication of real time information, from mobile stations assigned to the radio resource associated with the first uplink channel that are involved with the communication of information other than real time information; and
    reassign only the mobile stations involved with the communication of real time information other than the first mobile station to the radio resource associated with the at least one second uplink channel in response to the detected transmission of real time information from the first mobile station.

18. The system of claim 17, wherein the radio network operates to:
    receive a transmission of information other than real time information from a mobile station in a second uplink transmission block on the first uplink channel; and
    receive a transmission of real time information from the first mobile station in at least one uplink transmission block on the first uplink channel substantially immediately following the second uplink transmission block.

19. The system of claim 13, wherein the radio network operates to:
    receive a transmission of real time information from the first mobile station on the first uplink channel in one or more successive uplink transmission blocks following the first uplink transmission block;
    detect a completion of the transmission of real time information from the first mobile station in the one or more successive uplink transmission blocks; and
    transmit to the first mobile station an indication of an uplink transmission block in which the first mobile station is scheduled to transmit SID information.

20. The system of claim 13, wherein the radio network operates to:
    periodically receive silence description (SID) information on a third uplink channel from each mobile station assigned to the radio resource associated with the first uplink channel that is in a discontinuous transmission (DTX) state, wherein each mobile station in the DTX state transmits SID information in a distinct block on the third uplink channel.

21. The system of claim 13, wherein the radio network operates to:
    receive a transmission of real time information on the first uplink transmission block in the first uplink channel from a second mobile station assigned to the radio resource associated with the first uplink channel;
    reassign the second mobile station to a radio resource associated with the at least one second uplink channel; and
    receive a transmission of real time information from the second mobile station on the at least one second uplink channel assigned thereto following the first uplink transmission block.

22. The system of claim 13, wherein the radio network operates to:
    reassign at least one mobile station other than the first mobile station to the radio resource associated with the at least one second uplink channel by transmitting an indication of the reassignment as part of an inband signal in a first downlink transmission block substantially immediately following the first uplink transmission block.

23. A method for obtaining fast access to a multiplexed unlink channel in a mobile telecommunications system, comprising the steps of:
    assigning a plurality of mobile stations to a radio resource for a first unlink channel;
    initially receiving, in a first uplink transmission block on the first uplink channel, a transmission of real time information by a first mobile station; and
    reassigning, to a radio resource for a third uplink channel, mobile stations other than the first mobile station that are assigned to the radio resource for the first uplink channel in the step of assigning, in a downlink transmission block substantially immediately following the first uplink transmission block;
    receiving, in an uplink transmission block on the first uplink channel, a completion of a transmission of real time information by the first mobile station; and
    scheduling an uplink transmission block in which the first mobile station is to transmit silence descriptor (SID) information in a second uplink channel.

24. The method of claim 23, wherein the mobile stations that are reassigned to the radio resource for the third uplink channel are mobile stations involved with communicating real time information.

25. The method of claim 23, further comprising the steps of:
   receiving, in a second uplink transmission block on the first uplink channel, time insensitive information from a second mobile station assigned to the radio resource for the first uplink channel; and
   receiving, in successive uplink transmission blocks substantially immediately following the second uplink transmission block on the first uplink channel, real time information from the first mobile station.

26. The method of claim 23, wherein the step of reassigning comprises the step of:
   transmitting to a second mobile station that is receiving real time information on a downlink channel, an inband signal in the real time information that identifies the third uplink channel to which the second mobile station is reassigned.

* * * * *